Jan. 19, 1965  E. D. AMELUNG ETAL  3,166,360
PISTON ROD SEALING DEVICE
Filed March 15, 1962
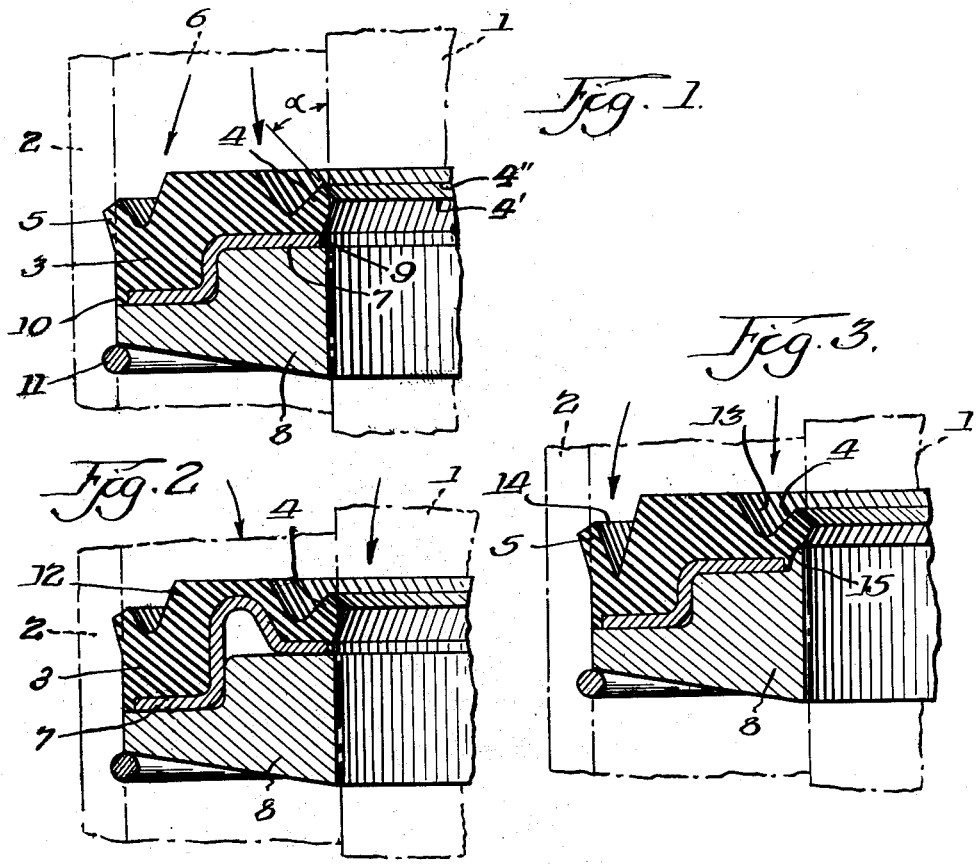
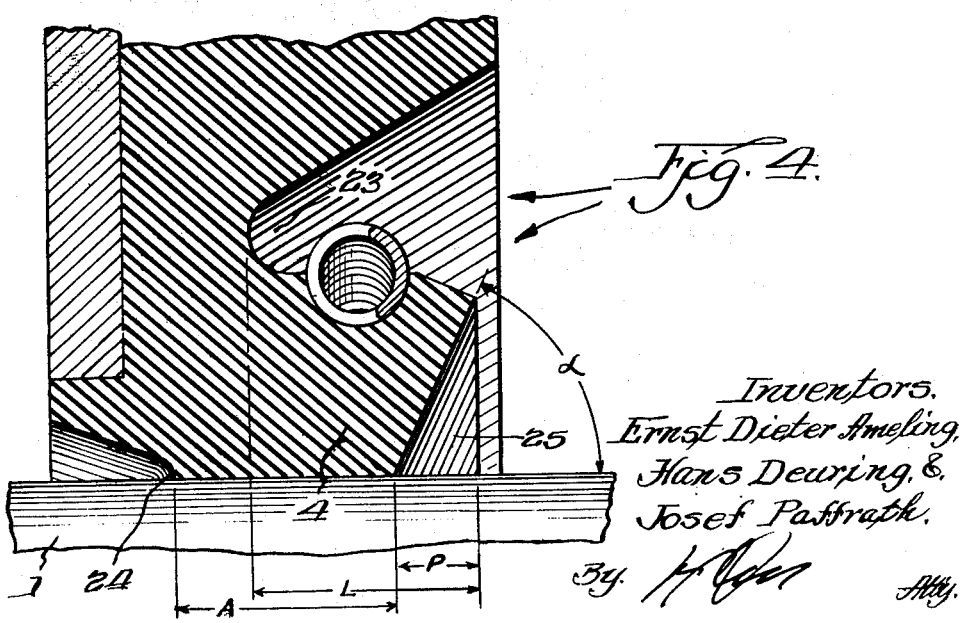
Inventors.
Ernst Dieter Amelung,
Hans Deuring, &
Josef Paßrath.
By
Atty.

United States Patent Office 3,166,360
Patented Jan. 19, 1965

3,166,360
PISTON ROD SEALING DEVICE
Ernst Dieter Amelung, Opladen, Hans Deuring, Burscheid, near Cologne, and Josef Paffrath, Bergisch-Neukirchen, Germany, assignors to Goetzewerke Friedrich Goetze Aktiengesellschaft, Burscheid, near Cologne, Germany, a corporation of Germany
Filed Mar. 15, 1962, Ser. No. 179,872
Claims priority, application Germany, Mar. 16, 1961, G 31,835
9 Claims. (Cl. 308—3.5)

The invention disclosed herein relates to the sealing of piston rods and is particularly concerned with sealing means for piston rods for hydraulic oscillation dampers or shock absorbers of motor vehicles, comprising a sealing lip which is pressed in sealing position by the pressure of the medium against which the seal is effective.

The reciprocating rod is in prior hydraulic shock absorbers sealed by means of an elastic rubber seal, such seal having usually two lips, one of such lips, which is loaded by means of a spring, being intended for preventing the outflow of the damping fluid, while the other lip protects the interior of the device against the ingress of dust and the like.

While such seals operate well in ordinary practical use, they are not adapted for modern high pressure shock absorbers. High pressure shock absorbers are usually provided with an air cushion which may be separated from the hydraulic fluid by an elastic bellows. Seals which are suitable for such absorbers are predominantly provided with a sealing lip which is not spring loaded since the pressure of the fluid medium suffices to press the sealing lip against the rod which is to be sealed.

Other known seals are composed of two different parts, the part thereof which lies against the rod being pressed thereagainst by an elastic washer which expands radially under the action of the hydraulic pressure. While such seals are relatively effective in the presence of higher pressures, they have not gained general acceptance since they suffer from the drawback that they are structurally complicated.

Sleeve seals stiffened by means of metallic supporting sheet, and having two sealing lips and intermediate stop buffers, are likewise known. However, the lips of such sleeve seals are relatively long and thin, and the end faces of the lips extend perpendicularly to the surface of the rod, thus permitting the hydraulic pressure to become effective over the entire surface of the lip, necessarily resulting in great wear. Such seals can hardly be used for sealing against higher pressures.

Sleeve seals provided with two sealing lips without metallic stiffening are also known, such seals requiring special holding or supporting means so as to prevent shifting of the adhering part. The end face of the lips is in such structures inclined with respect to the free surface of the rod, so as to provide more material in the region of the lips, with the intention of increasing the pressure of the lip at the rod circumference. The legs of the lips are subjected to the full pressure of the hydraulic medium, making such seals unsuitable for use in the presence of higher pressures such as they obtain, for example, in hydraulic shock absorbers.

The present invention proceeds from a seal, to the adhering part of which is firmly connected with a sheet metal support, and having, for the radial positioning, a sealing lip extending circumferentially respectively inside and outside thereof, such lips being affected by the pressure of the hydraulic medium. In order to improve such seals, it is in accordance with the invention proposed to provide a structure wherein the end face of the sealing lip, which is directed toward the rod embraces in operating position, in known manner, an angle with the free rod circumference which is smaller than 90°, the area of the lip which is in engagement with the rod being greater than the projection area of the end face of the lip on the rod, and the area of the lip which is radially affected by the hydraulic medium being smaller than the engaging area and the projection area of the end face of the lip taken together.

The advantage of this particular configuration of the lip is that the hydraulic relief of the end face of the lip decreases with progressive wear and that a loading is in the same measure produced, whereby the pressure exerted by the lip can be maintained constant over a wide range. It is to be observed, however, that the lip is to be made relatively short and radially strong so as to avoid drawing thereof into the gap between the seal and the rod.

Such lips are exclusively affected by the pressure of the hydraulic medium and the auxiliary spring can therefore be omitted. However, the invention may also be advantageously used in connection with spring loaded lips. The outer diameter of the seal may be wholly or partially larger than the inner diameter of the cylinder tube, so that the seal engages the cylinder wall with pressure, thus preventing outflow of the damping fluid. This effect may be in most simple manner supported by forming the outer part of the seal likewise in the manner of a lip.

In order to avoid damaging the sealing lips by impact of the piston, it is moreover proposed to provide between the sealing lips a stop made of the same material as the lips and extending axially beyond the radial plane thereof. Such stop can elastically absorb impacts of the piston without detrimentally affecting the sealing lips. The pressure of the hydraulic medium is in such structure positively applied along annular grooves extending between the stop buffer and the respective sealing lips, such grooves permitting radial yielding or expansion motion of the buffer, which contributes towards holding the sealing lips in their sealing position.

It has also been found of advantage to line the inner face of the metallic supporting sheet with an elastic material in order to avoid metallic engagement with the piston rod, as such metallic engagement might produce grooves in the piston rod which could easily result in damage to the material of the sealing lip.

The piston rod of the shock absorber is in most cases secured against radial tipping by a rod guide. Whenever the seal is to be provided for particularly high pressures, the inner sealing lip may be sealed by a collar-like part of the rod guide, in such a manner, that the pressure on the lip is absorbed by such part, thereby preventing squeezing of the lip into the gap between the guide and the rod.

In the event that the seal is to be made relatively stiff in radial direction, the metallic support may be made in stepped manner, thereby forming in the area of the stop buffer a hump-like portion which can be matched to the shape of the respective buffer.

The step-like configuration of the metallic support provides the further advantage that the seal can be placed in most simple manner upon a section of the rod guide without requiring any further fastening means. Moreover, it is in this way possible to shorten the axial dimensions of the seal as well as of the rod guide.

The annular grooves between the two lips and the stop buffer may be made of substantially the same depth so that they terminate substantially along a common radial plane. It is however likewise possible to make the annular groove between the outer lip and the stop buffer deeper than the groove between the stop buffer and the inner lip, so that the hydraulic pressure exerts at such place a further force component upon the corresponding sealing lip.

It is moreover entirely possible to arrange the seal floating between the piston rod and the cylindrical tube of the damper, without necessarily requiring mechanical connection with these parts or with the rod guide, thus facilitating the automatic setting of the seal.

Further details will appear from the description of embodiments which will be rendered below with reference to the accompanying drawing.

FIG. 1 shows a seal according to the invention comprising a metallic support bent at right angle;

FIG. 2 illustrates a seal having a metallic support which extends in the manner of hump;

FIG. 3 represents a seal in which the sealing lip is supported by the rod guide; and FIG. 4 shows a sealing lip in cross-sectional view.

Referring now to the drawings, between the piston rod 1 and the cylinder tube 2 is provided the sealing member 3, having sealing lips 4 and 5 which prevent the outflow of hydraulic fluid from the space 6. Both sealing lips 4 and 5 are pressed against respectively associated surfaces, exclusively by the pressure of the hydraulic fluid, such pressure supporting the inherent tension of the lips. The sealing lip 4 has two surfaces, extending angularly with respect to the piston rod 1, the end face of the sealing lip extending, in position assembled with the piston rod, at an angle which is smaller than 90°. The projection of the end face extending to the piston road at an angle from the edge 4' of the sealing lip to the transition edge 4", is in assembled position of the seal, smaller than the area of engagement of the sealing lip on the piston rod, so as to avoid endangering the equalization or compensation between the loading and relief of the sealing lip in the presence of a pressure acting too strongly in lifting sense. The sealing member 3 is connected with a metallic support 7 which is vulcanized thereto, the angularly shaped metallic support being firmly disposed upon the stepped rod guide 8. The inside edge as well as the peripheral outer edge of the metallic support 7 are coated with elastic material as indicated respectively at 9 and 10. The rod guide 8 is secured against axial displacement by means of a split ring 11.

The seal shown in FIG. 2 differs from the one represented in FIG. 1 merely in the provision of a metallic support 7 which is formed hump-like in the area of the stop buffer 12. The sealing member 3 is thereby radially stiffened and prevents the material of the buffer 12 from influencing the sealing lip 4.

In FIG. 3, the grooves 13, 14 between the lips 4 and 5 are of different depth, whereby the sealing lip 4 can be pressed stronger against the piston rod by the pressure of the hydraulic medium. Arrows on the respective figures show pressure of the hydraulic medium. Moreover, the piston rod guide 8 is, in the range of the sealing lip 4, provided with a collar 15 which supports such lip in the presence of relatively great hydraulic loading.

In FIG. 4, the lip 4 likewise embraces the piston rod 1, lying against the rod 1 with the section A. The area of the engaging section A is always greater than the projection area P of the end face plane 25 of the lip, thereby resulting in engagement with uniform pressure over a long period of time. This is further supported by placing the recess 23 outside the radial plane 24, so that the area L, designated as the radially outwardly extending area, which is affected by the hydraulic medium, is always smaller than the engaging area A and the projection area P taken together.

Changes may be made within the scope and spirit of the appended claims which define what is believed to be new and desired to have protected by Letters Patent.

We claim:

1. A sealing device for piston rods of hydraulic shock absorbers for motor vehicles, comprising a cylindrical tube, a piston rod, an annular sealing member positioned between the walls of the tube and piston rod, said annular sealing member being made of elastic material which is stiffened by a metallic disk-like support joined therewith, an inner sealing lip formed by said sealing member for sealing engagement with said piston rod, said sealing lip being adapted to be acted upon by the pressure of a hydraulic medium, the end face of said sealing lip embracing with the free surface of said piston rod an angle which is less than 90°, the area of engagement of the lip with said piston rod being greater than the projection area of the end face of the lip on said piston rod, and the radially outwardly extending area from the area of engagement and the projection area of the sealing lip which is adapted to be acted upon by the hydraulic medium being greater than the projection area and smaller than the engaging area and the projection area taken together.

2. A sealing device according to claim 1, wherein the inner edge of said metallic support is covered by part of the material of said lip.

3. A sealing device according to claim 2, in combination with a guide member for said piston rod, said guide member carryng said sealing member, and a collar-like extension projecting from said guide member for supporting said sealing lip.

4. A sealing device according to claim 2, wherein said sealing device is disposed within a cylindrical tube, in combination with a guide member for said piston rod, said guide member carrying said sealing member, and means for securing said guide member in engagement with said tube.

5. A sealing device according to claim 1, the outer diameter of said sealing member being at least in part greater than the inner diameter of said tube.

6. A sealing device according to claim 5, comprising an outer sealing lip formed by said sealing member for sealing engagement with the inner wall of said tube, and an enlargement formed on said sealing member between said sealing lips, said enlargement extending axially beyond the plane of said sealing lips and forming a stop for impact engagement with the piston cooperatively associated with said piston rod.

7. A sealing device according to claim 5, comprising an outer sealing lip formed by said sealing member for sealing engagement with the inner wall of said tube, an annular groove formed in said sealing member adjacent said outer sealing lip, the material of said sealing member extending axially beyond the plane of said sealing lips and forming a stop for protecting said sealing lips against impact by the piston cooperatively associated with said piston rod.

8. A sealing device according to claim 7, wherein one of said annular grooves is deeper than the other.

9. A sealing device according to claim 7, wherein said metallic support is angularly shaped forming a hump-like portion with the area of said stop formed by said sealing member.

References Cited by the Examiner

UNITED STATES PATENTS

| | | | |
|---|---|---|---|
| 2,078,364 | 4/37 | Becker | 267—8 |
| 2,467,210 | 4/49 | Helfrecht | 277—235 |
| 2,907,596 | 10/59 | Maha | 277—205 |
| 2,992,864 | 7/61 | De Carbon | 308—3.5 |
| 3,003,799 | 10/61 | Marchionda | 277—205 X |
| 3,104,883 | 9/63 | English | 277—205 |

FRANK SUSKO, *Primary Examiner.*
ROBERT C. RIORDON, *Examiner.*